US007497006B2

(12) United States Patent
Davis et al.

(10) Patent No.: US 7,497,006 B2
(45) Date of Patent: Mar. 3, 2009

(54) METHOD FOR RELEASABLY MOUNTING A HEAD SLIDER TO A DISK DRIVE HEAD SUSPENSION

(75) Inventors: Michael W. Davis, Rockford, MN (US);
Galen D. Houk, Hutchinson, MN (US);
Ajay Sharma, Prior Lake, MN (US);
Kia Moh Teo, Eden Praire, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 347 days.

(21) Appl. No.: 11/408,782

(22) Filed: Apr. 21, 2006

(65) Prior Publication Data

US 2006/0236527 A1 Oct. 26, 2006

Related U.S. Application Data

(60) Provisional application No. 60/728,261, filed on Oct. 19, 2005, provisional application No. 60/674,322, filed on Apr. 22, 2005.

(51) Int. Cl.
*G11B 5/127* (2006.01)
*H04R 31/00* (2006.01)

(52) U.S. Cl. .............. 29/603.06; 29/603.03; 29/603.04; 360/121; 360/122; 360/245.9; 360/264.2; 427/127; 427/128

(58) Field of Classification Search ............. 29/603.03, 29/603.04, 603.06; 360/121, 122, 245.9, 360/264.2; 427/127, 128
See application file for complete search history.

(56) References Cited

U.S. PATENT DOCUMENTS 5,625,514 A * 4/1997 Kubo et al. .............. 360/254.8

| 6,741,425 B1 * | 5/2004 | Wu et al. ............. 360/245.1 |
| 6,796,018 B1 | 9/2004 | Thornton |
| 6,943,971 B2 | 9/2005 | Kainuma et al. |
| 2006/0072245 A1 | 4/2006 | Motonishi et al. |

FOREIGN PATENT DOCUMENTS

JP 09251627 9/1997

OTHER PUBLICATIONS

International Search Report and Written Opinion from international application No. PCT/US06/15040, mailed Aug. 13, 2008, 14 pp.
International Preliminary Report on Patentability for international application No. PCT/US2006/015040, mailed Oct. 2, 2008, 8 pp.

* cited by examiner

*Primary Examiner*—Paul D Kim
(74) *Attorney, Agent, or Firm*—Faegre & Benson LLP

(57) ABSTRACT

A method for mounting a head slider of the type having terminal pads to a wireless disk drive head suspension flexure including a slider mounting region, lead contact pads, and a deflectable and resilient slider engagement member for releasably mounting a head slider to the slider mounting region. The method includes engaging and deflecting the slider engagement member and positioning the head slider onto the slider mounting region and between the lead contact pads and the slider engagement member while the slider engagement member is deflected. The method further includes disengaging the slider engagement member and causing the slider engagement member to force the head slider into frictional engagement with the lead contact pads and the slider engagement member with the lead contact pads in mechanical and electrical contact with the head slider terminal pads.

18 Claims, 9 Drawing Sheets

METHOD FOR RELEASABLY MOUNTING A HEAD SLIDER TO A DISK DRIVE HEAD SUSPENSION

CROSS REFERENCE TO RELATED APPLICATIONS

This application claims the benefit of U.S. Provisional Patent Application Ser. No. 60/674,322 entitled "Head Suspension Gimbal for Removable Slider" filed Apr. 22, 2005, and U.S. Provisional Patent Application Ser. No. 60/728,261 entitled "Improved Removable Gimbal Slider" filed Oct. 19, 2005, both of which are incorporated herein by reference in their entireties.

FIELD OF THE INVENTION

The present invention relates generally to wireless or integrated lead flexures for magnetic disk drive head suspensions. In particular, the invention is a structure and method for releasably mounting a head slider to a wireless flexure.

BACKGROUND OF THE INVENTION

Wireless or integrated lead flexures for magnetic disk drive suspension assemblies are known. Conventional wireless flexures are mounted to a load beam and include a plurality of leads and a structure (e.g., a tongue having a slider receiving surface) to which a head slider is mounted. The head slider is an electronic component including a magnetic read/write transducer which can read and/or write data from/to the magnetic disk. In conventional flexures, the head slider is fixedly mechanically mounted to the flexure (e.g., by adhesive) and electrically connected to the leads (e.g., by solder or conductive gold ball bonding). Testing is typically performed on the assembled flexure and slider or suspension assembly before they are incorporated into a disk drive. Such testing may include, for example, dynamic electrical testing as is know in the art. Because the slider is fixedly mounted to the flexure of the suspension assembly, the entire suspension assembly must be discarded if the slider is rejected for failing one or more of these tests.

Accordingly, there is a need for a flexure and method for releasably mounting a head slider for testing the slider. In particular, there is a need for a wireless flexure that can serve as a tool or fixture for releasably mounting a head slider for testing the slider as well as a production flexure assembly to which the slider can be fixedly mounted.

SUMMARY OF THE INVENTION

The present invention is a device and method for releasably mounting a head slider to a magnetic disk drive head suspension assembly. The invention can be used to test the head slider, or as a production assembly. In one embodiment, the present invention is a tool for releasably supporting and testing a head slider. The tool comprises a base region, a pair of laterally-spaced outer arms extending from the base region, a cross member extending between the outer arms, and a slider mounting region. Mounting arms extend from the cross member for supporting the slider mounting region between the outer arms. The tool also includes a plurality of integrated leads terminating at lead contact pads, and a deflectable slider engagement member for forcing a head slider into frictional engagement with the slider mounting region and the lead contact pads.

DETAILED DESCRIPTION OF THE PREFERRED EMBODIMENTS

Figure 1:
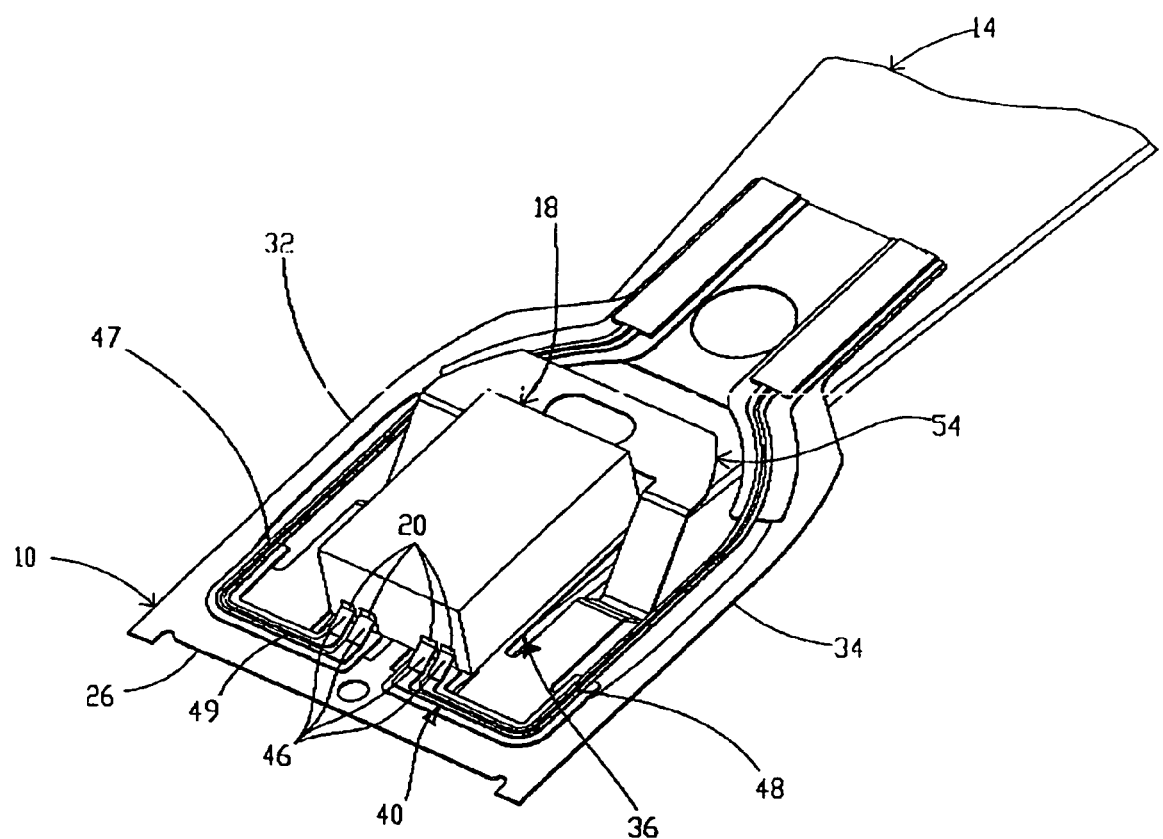
FIG. 1 is a perspective schematic view of a wireless disk drive head suspension flexure having a releasable slider engaging structure according to one embodiment of the present invention.

FIG. 1 is a perspective schematic view of a distal portion a wireless disk drive head suspension flexure 10 according to one embodiment of the present invention shown mounted to a load beam 14. A head slider 18 including terminal pads 20 is shown mounted to the flexure 10. The load beam 14 and the head slider 18 can be of conventional design and structure. As will be discussed in detail below, the slider 18 can be releasably mounted to the flexure 10. Thus, in one embodiment, the flexure 10 can be used as a reusable test tool or fixture for releasably mounting and testing one or more head sliders 18. Alternatively, if desired, the slider 18 can be fixedly mounted to the flexure 10 and used in a conventional manner in a disk drive head suspension if, for example, the slider 18 passes the required tests.

As illustrated in FIG. 1, the flexure 10 includes a cross member 26 extending between a pair of flexure arms 32 and 34, and a tongue or slider receiving member 36 extending from and supported by the cross member 26 between the flexure arms 32, 34. As further shown, the flexure 10 includes a plurality of integrated leads 40 terminating in lead contact pads 46 adjacent to the slider receiving member 36. In the illustrated embodiment, the leads 40 are located between the flexure arms 32, 34 and are supported by dielectric members 47, 48. The distal most portions of the leads 40 are supported by the cross member 26. A dielectric insulating layer 49 is located between portions of the leads 40 that overlay the cross member 26. In other embodiments (not shown), the leads 40 extend over the flexure arms 32, 34 and are separated from the flexure arms 32, 34 by a layer of dielectric.

As illustrated in FIG. 1, the flexure 10 also includes an elastically deflectable slider engagement member 54 for releasably mounting the slider 18 to the slider receiving member 36. As will be explained in detail below, the slider engagement member 54 causes the slider 18 to be releasably mounted on the flexure 10 with the lead contact pads 46 in contact (both mechanically and electrically) with respective terminal pads 20 of the slider 18. The slider engagement member 54 maintains the slider 18 in mechanical and electrical contact with the lead contact pads 46, while later allowing the slider 18 to be removed and replaced.

Figure 2A:
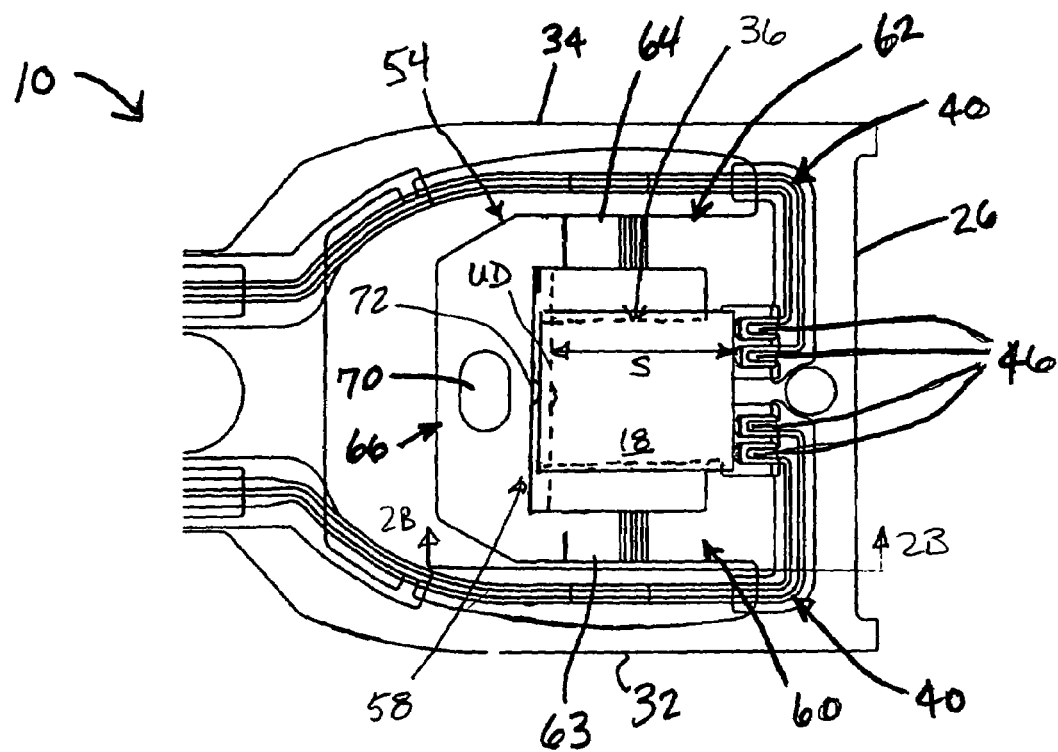
FIGS. 2A and 2B are plan and partial side views, respectively, of the flexure of FIG. 1.
Figure 2B:
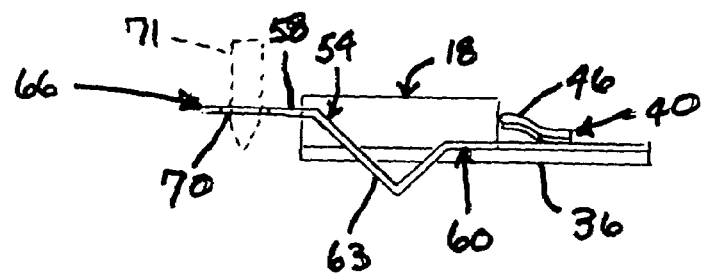

FIGS. 2A and 2B are plan and partial side views, respectively, of distal portions of the flexure 10 showing the slider 18 mounted on the slider receiving member 36. As shown in FIGS. 2A and 2B, the slider engagement member 54 is deflectable and resilient, and includes a slider engagement portion 58, a pair of laterally spaced spring arms 60, 62, and a tooling engagement portion 66. The spring arms 60, 62 extend from the cross member 26 to the slider engagement portion 58. In the illustrated embodiment, the spring arm 60 is positioned between the flexure arm 32 and the slider receiving member 36, and the spring arm 62 is positioned between the flexure arm 34 and the slider receiving member 36. As shown, the spring arms 60, 62 include, respectively, elastically extendable portions 63, 64. In the illustrated embodiment, the extendable portions 63 and 64 are formed out of the plane of the flexure arms 32 and 34 to enable the slider engagement portion 58 to be deflected away from the cross member 26. As shown, the tooling engagement portion 66 is connected to or located on the slider engagement portion 58. In the illustrated embodiment, the tooling engagement portion 66 includes an aperture 70. As shown in FIG. 2B, the aperture 70 can be engaged by tooling, which as illustrated is a tapered pin 71, that is moved to deflect the slider engagement portion 58 in a direction away from the cross member 26. The slider engagement portion 58 further includes a structure, which in the illustrated embodiment is a projection or bump 72, extending from the slider engagement portion 58 for promoting positive engagement with the slider 18.

The deflectable slider engagement member 54 releasably secures the slider 18 to the flexure 10. In an undeflected state of the slider engagement member 54 (as indicated by dashed lines labeled "UD" in FIG. 2A), separation S between the slider engagement portion 58 and the lead contact pads 46 is smaller than a length of the slider 18. The slider engagement portion 58 can be deflected in a direction away from the lead contact pads 46 by an amount sufficient to permit the slider 18 to be positioned on the slider engagement member 36. Such deflection of the slider engagement portion 58 can be accomplished, for example, by engaging the aperture 70 with the tapered pin 71 or other suitable tool and using this tool to forcibly deflect the slider engagement portion 58 by a sufficient amount. In some circumstances, it may be advantageous to clamp or otherwise fix the distal most portion of the flexure 10 (i.e., the cross member 26 and the distal most ends of the flexure arms 32, 34) in place to facilitate deflecting the slider engagement portion 58 using a tool such as the tapered pin 71. With the slider 18 in position, upon releasing the slider engagement member 54, the spring arms 60, 62 will attempt to elastically return to their undeflected state, thus forcing the slider engagement portion 58 against the slider 18, which becomes frictionally engaged with and between the slider engagement portion 58 and the lead contact pads 46. If desired, an electrically conductive substance (e.g., solder) can be applied to the interface between the terminal pads 20 and the lead contact pads 46 to further promote positive electrical contact between these structures.

As shown in FIG. 2B, the lead contact pads 46 are non-linear (i.e., bent) and extend out of the general plane of the flexure 10. In other embodiments, the lead contact pads may be substantially linear and/or may include both linear and non-linear portions. The portions of the leads 40 adjacent the lead contact pads 46 are also deflectable and resilient, and can exert a spring force when deflected. In one embodiment, the spring arms 60, 62 are more rigid than the lead contact pads 46, causing the lead contact pads 46 to be deflected away from the slider engagement portion 58 when the slider engagement member 54 forces the slider 18 into the lead contact pads 46. The lead contact pads 46 will therefore impose a spring force on the slider 18 in a direction generally opposite that imposed by the slider engagement member 54, thereby enhancing the frictional engagement of the lead contact pads 46 and the slider engagement portion 58 with the slider 18. Once mounted, the slider 18 can be removed from the flexure 10 by again deflecting the slider engagement portion 58 away from the lead contact pads 46 to release the slider 18 from frictional engagement with the slider engagement portion 58 and lead contact pads 46.

Figure 2C:
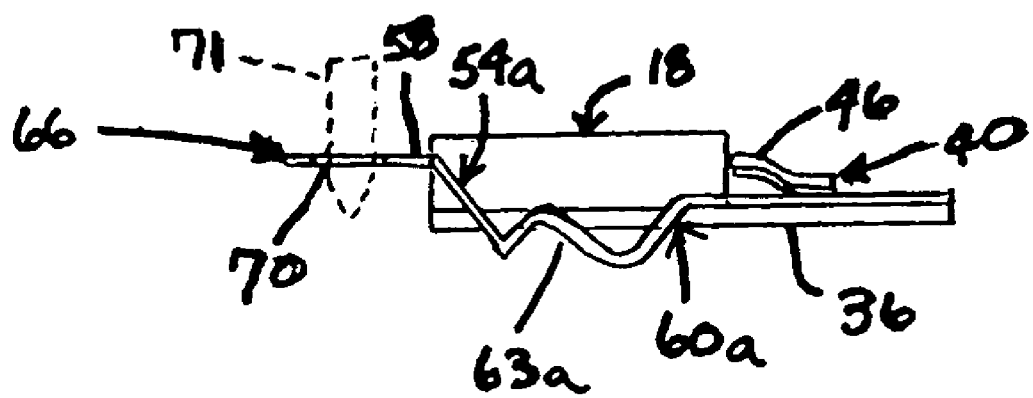
FIG. 2C is a partial side view of the flexure of FIG. 1 including an alternative releasable slider engaging structure.

FIG. 2C is a side view of a portion of the flexure 10 including an alternative deflectable slider engagement member 54a for releasably mounting the slider 18 to the flexure 10. As shown, the slider engagement member 54a includes a spring arm 60a including an elastically extendable portion 63a having at least two undulations, in contrast to the substantially V-shaped elastically extendable portions 63, 64 of the spring arms 60, 62 described above. For illustration purposes, only a spring arm 60a with elastically extendable portion 63a is shown in the side view of FIG. 2C, although it will be appreciated that the slider engagement member 54a includes a corresponding second spring arm with an elastically extendable portion on the opposite side of the slider 18. The slider engagement member 54a, the spring arm 60a, and the elastically extendable portion 63a operate in substantially the same manner as the slider engagement member 54, the spring arm 60, and the elastically extendable portion 63 described above. Additionally, the slider engagement member 54a is in other respects identical to the slider engagement member 54 described above.

Figure 3A:
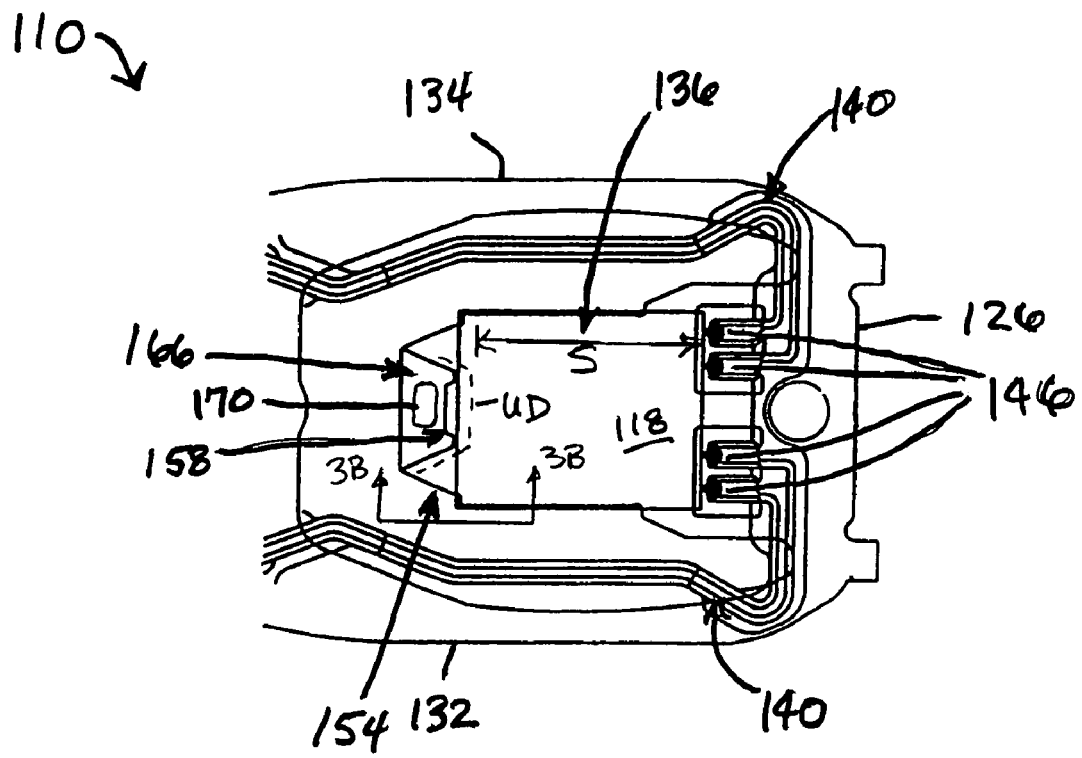
FIGS. 3A and 3B are plan and partial side views of a flexure according to another embodiment of the present invention.
Figure 3B:
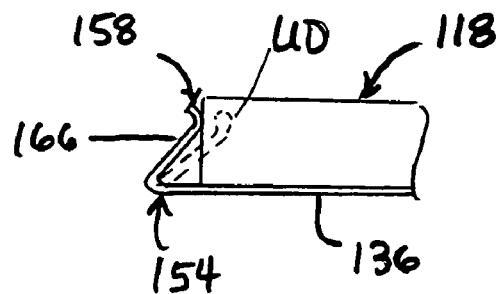

FIGS. 3A and 3B are plan and partial side views of a flexure 110 according to another embodiment of the present invention with a slider 118 releasably mounted thereon. As shown in FIGS. 3A and 3B, the flexure 110 includes a cross member 126 extending between a pair of flexure arms 132 and 134, and a tongue or slider receiving member 136 extending from and supported by the cross member 126 between the flexure arms 132, 134. As illustrated, the flexure 110 includes a plurality of integrated leads 140 terminating in lead contact pads 146 (which in the illustrated embodiment include conductive metallic balls for frictionally engaging the terminal pads, not shown, of the slider 118) adjacent to the slider receiving member 136.

As further shown, the flexure 110 includes a deflectable slider engagement member 154 attached to the slider mounting member 136. Like the slider engagement member 54 of the flexure 10, the slider engagement member 154 releasably mounts the slider 118 to the slider mounting member 136. In the illustrated embodiment, the deflectable slider engagement member 154 is a deflectable tab or flange extending at an angle from a proximal end of the slider receiving member 136, and includes a slider engagement portion 158 and a tooling engagement portion 166 having, in the illustrated embodiment, an aperture 170. The slider engagement portion 158 is biased toward the lead contact pads 146, and can be deflected in a direction away from the lead contact pads 146.

When so deflected, the elastic slider engagement member 154 produces a spring force for forcing a slider into frictional engagement with the slider engagement member 158 and the lead contact pads 146.

As illustrated in FIG. 3A, in an undeflected state of the slider engagement member 154 (as indicated by dashed lines labeled "UD" in FIGS. 3A and 3B), separation S between the slider engagement portion 158 and the lead contact pads 146 is smaller than the length of the slider 118. Deflection of the slider engagement portion 158 away from the lead contact pads 146 allows for positioning the slider 118 on the slider receiving member. The slider engagement portion 158 can be deflected, for example, by engaging the aperture 170 of the tooling engagement portion 166 with a suitable tool (e.g., in the manner described above with respect to the slider engagement member 54) and pulling the slider engagement portion 158 in a direction away from the lead contact pads 146. As with the flexure 10 described above, in some circumstances, it may be advantageous to clamp or otherwise fix the distal most portion of the flexure 110 (i.e., the cross member 126 and the distal most ends of the flexure arms 132, 134) in place to facilitate deflecting the slider engagement portion 158. Releasing the tooling engagement portion 166 causes the slider engagement member 154 to attempt to return to the slider engagement portion 158 to its undeflected state, forcing the slider 118 into frictional engagement with the slider engagement portion 158 and the lead contact pads 146.

Alternatively, the slider 118 could be forced between the slider engagement portion 158 and the lead contact pads 146 to push apart the deflectable slider engagement member 154 and the deflectable lead contact pads 146, which will frictionally engage the slider 118 there between. In either case, the slider 118 can be removed by deflecting the slider engagement member 158 (e.g., by engaging the tooling engaging portion 166 as described above) to release the slider 118 from frictional engagement with the slider engagement member 158 and the lead contact pads 146.

Figure 4A:
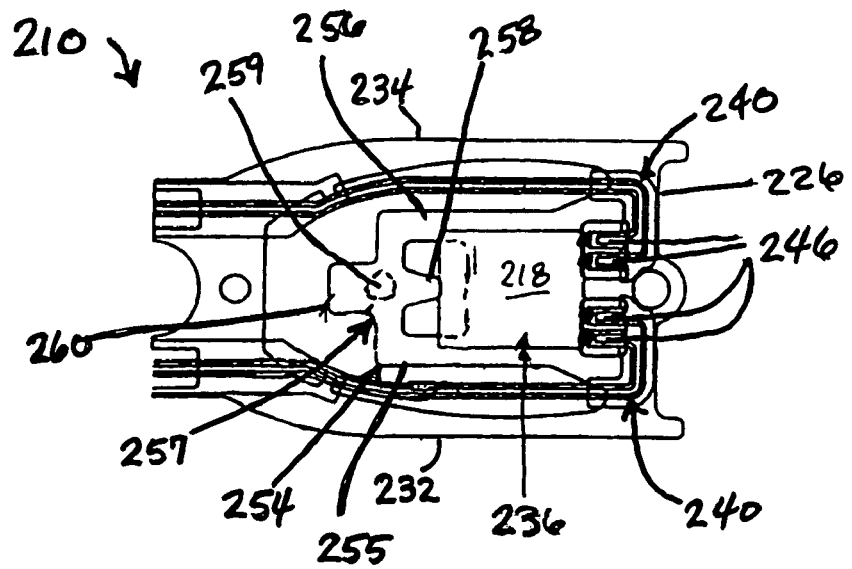
FIG. 4A is a plan view of a flexure according to another embodiment of the present invention.

FIG. 4A illustrates a plan view of a portion of a flexure 210 according to another embodiment of the present invention. As shown in FIG. 4A, the flexure 210 includes a cross member 226 extending between a pair of flexure arms 232 and 234, and a tongue or slider receiving member 236 extending from and supported by the cross member 226 between the flexure arms 232, 234. As illustrated, the flexure 210 includes a plurality of integrated leads 240 terminating in lead contact pads 246 (which in the illustrated embodiment include conductive metallic balls for frictionally engaging the terminal pads, not shown, of the slider 218) adjacent to the slider receiving member 236. The flexure 210 further includes a slider engagement member 254 for releasably mounting a slider 218 to the slider mounting member 236.

As illustrated in FIG. 4A, the slider engagement member 254 includes a pair of lateral arms 255, 256 extending proximally from the slider receiving member 236 to a proximal portion 257. As further shown, the proximal portion 257 includes a slider engagement portion 258, a pivot dimple engaging portion 259, and a push tab 260. As shown and discussed in detail below, the slider engagement portion 258 can be deflected upward to permit a slider to be positioned on the slider mounting member 236, and the slider engagement member 254 can thereafter force the slider 218 into frictional engagement with the lead contact pads 246 and the slider engagement portion 258.

Figure 4B:
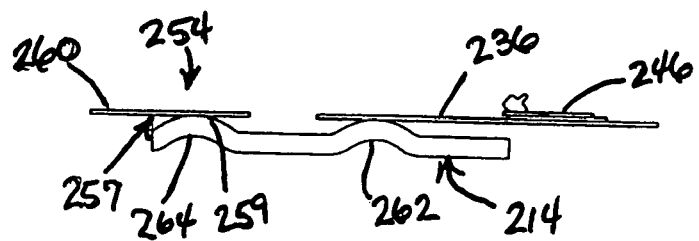
FIGS. 4B-4D are partial side views of the flexure shown in FIG. 4A, illustrating schematically a method in accordance with the invention for releasably mounting a slider to the flexure.
Figure 4C:
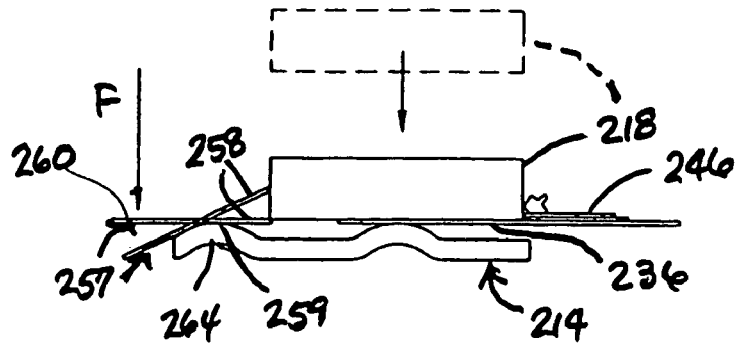
Figure 4D:
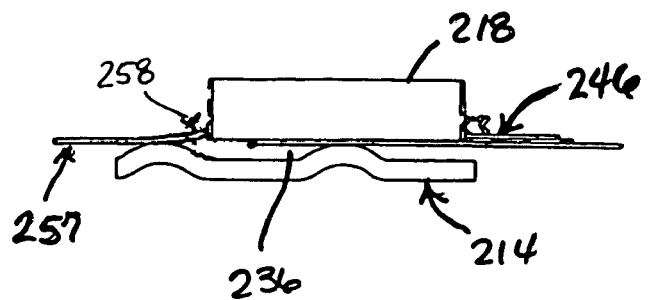

FIGS. 4B-4D depict, schematically, the operation of the slider engagement member 254 for releasably mounting the slider 218 to the slider receiving member 236. As shown in FIGS. 4B-4D, the slider receiving member 236 and slider engagement member 254 are supported by a load beam 214, which in the illustrated embodiment includes a gimbal dimple 262 for supporting the slider receiving member 236, and a pivot dimple 264 engaged with the pivot dimple engaging portion 259 of the slider engagement member 254. Applying a force F (FIG. 4C) to the push tab 260 causes the proximal portion 257 of the slider engagement member 254 to pivot on the pivot dimple 264, thereby deflecting the slider engagement portion 258 away from the load beam 214 as shown in FIG. 4C. The size of the opening between the slider engagement portion 258 and the lead contact pads 246 thereby increases. The slider 218 can then be positioned on the slider receiving member 236. In some circumstances, it may be advantageous to clamp or otherwise fix the distal most portion of the flexure 210 (i.e., the cross member 226 and the distal most ends of the flexure arms 232, 234) in place to facilitate deflecting the slider engagement portion 258.

Removing the force F causes the proximal portion 257 to attempt to elastically return to its undeflected state, causing the slider engagement portion 258 to engage the slider 218 and which forces the slider 218 into frictional engagement with the lead contact pads 246. In the illustrated embodiment, the slider engagement member 254 is more rigid than the lead contact pads 246, causing the lead contact pads 246 to be deflected away from the slider engagement member 254 as indicated in FIG. 4D (dashed lines indicating the initial position of the slider 218 prior to deflection of the lead contact pads 246). This deflection of the lead contact pads 246 enhances the frictional engagement of the slider engagement portion 258 and the lead contact pads 246 with the slider 218.

Figure 5:
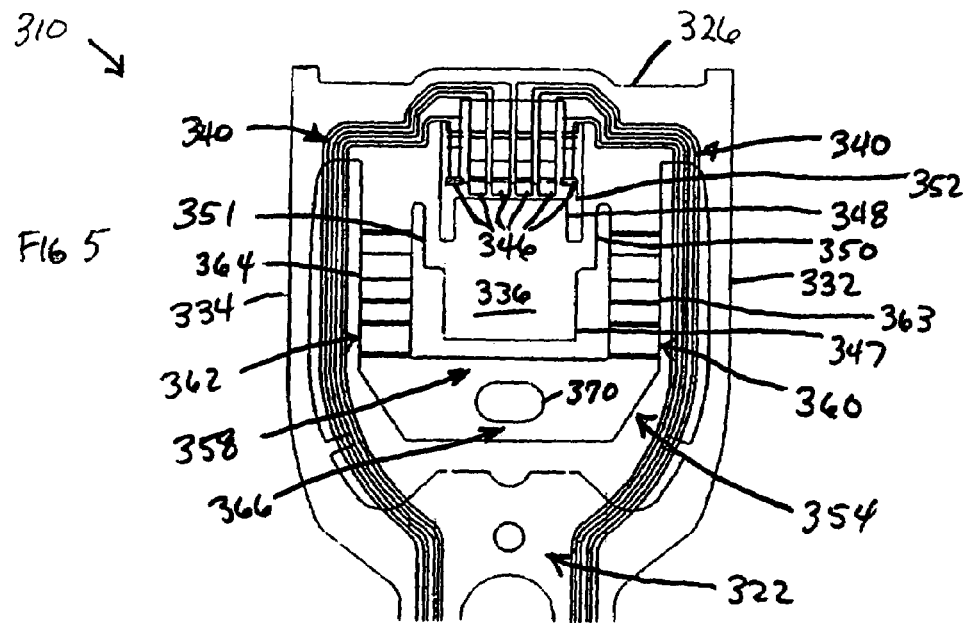
FIG. 5 is a plan view of a portion of a flexure having mounting arms for supporting a slider receiving member according to another embodiment of the present invention.

FIG. 5 is a plan view of a distal portion of a flexure 310 according to another embodiment of the present invention. As shown in FIG. 5, the flexure 310 includes a base portion 322 for mounting the flexure 310 to a load beam (not shown), a pair of laterally spaced flexure arms 332 and 334 extending distally from the base portion 322, a cross member 326 extending between the flexure arms 332, 334, a slider receiving member 336 positioned between the flexure arms 332, 334, and a plurality of integrated leads 340 terminating in lead contact pads 346 adjacent to the slider receiving member 336. The slider receiving member 336 has a proximal end 347 and a distal end 348, and is supported from the cross member 326 by a pair of mounting arms 350, 351 attached to the slider mounting member 336 approximately midway between the proximal and distal ends 347 and 348. As shown in FIG. 5, a gap 352 separates the distal end 348 of the slider engagement member 336 and the cross member 326, and the leads 340 extend from the cross member 326 across the gap 352 to locate the lead contact pads 346 adjacent the slider receiving member 336.

As further illustrated, the flexure 310 also includes a deflectable slider engagement member 354 for releasably mounting a slider (not shown) to the slider receiving member 336. The slider engagement member 354 includes a slider engagement portion 358, a pair of laterally spaced spring arms 360, 362, and a tooling engagement portion 366 including, in the illustrated embodiment, an aperture 370. The spring arms 360, 362 extend from the cross member 326 to the slider engagement portion 358. In the illustrated embodiment, the spring arm 360 is positioned between the flexure arm 332 and the slider receiving member 336, and the spring arm 362 is positioned between the flexure arm 334 and the slider receiving member 336. As shown, the spring arms 360, 362 include, respectively, elastically extendable portions 363, 364. It will be appreciated that the slider engagement member 354 is similar in design and function to the slider engagement member 54 of the flexure 10 described above.

The flexure 310 is in many respects similar to the flexure 10 described above, with the primary difference being the inclusion in the flexure 310 of the mounting arms 350, 351 for supporting the slider receiving member 336 from points approximately midway between its proximal and distal ends 347 and 348. The design of the flexure 310 minimizes crowning of the slider receiving member 336 when the slider engagement member 354 is deflected, and further allows the slider receiving member 336 to bend and deflect independently of the flexure arms 332, 334 when under load.

Figure 6:
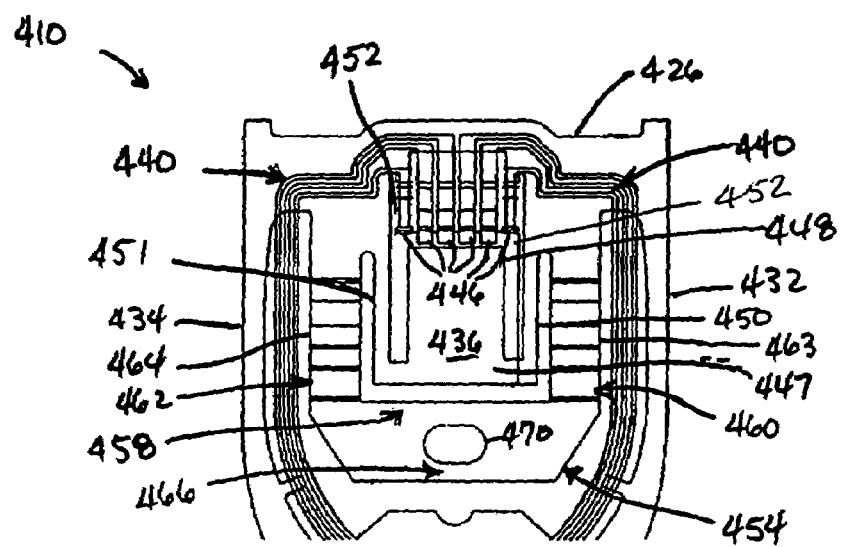
FIG. 6 is a plan view of a portion of a flexure having mounting arms for supporting a slider receiving member according to another embodiment of the present invention.

FIG. 6 is a plan view of a distal portion of a flexure 410 according to another embodiment of the present invention. As shown in FIG. 6, the flexure 410 includes a cross member 426 extending between a pair of laterally spaced flexure arms 432 and 434, a slider receiving member 436 between the flexure arms 432, 434, and a plurality of integrated leads 440 terminating in lead contact pads 446 adjacent to the slider receiving member 436. The slider receiving member 436 has a proximal end 447 and a distal end 448, and is supported from the cross member 426 by a pair of mounting arms 450, 451 attached to the slider mounting member 436 near its proximal end 447. As shown in FIG. 6, a gap 452 separates the distal end 448 of the slider engagement member 436 and the cross member 426, and the leads 440 extend from the cross member 426 across the gap 452 to locate the lead contact pads 446 adjacent the slider receiving member 436.

As further illustrated, the flexure 410 also includes a deflectable slider engagement member 454 for releasably mounting a slider (not shown) to the slider receiving member 436. The slider engagement member 454 includes a slider engagement portion 458, a pair of laterally spaced spring arms 460, 462, and a tooling engagement portion 466 including, in the illustrated embodiment, an aperture 470. The spring arms 460, 462 extend from the cross member 426 to the slider engagement portion 458. In the illustrated embodiment, the spring arm 460 is positioned between the flexure arm 432 and the slider receiving member 436, and the spring arm 462 is positioned between the flexure arm 434 and the slider receiving member 436. As shown, the spring arms 460, 462 include, respectively, elastically extendable portions 463, 464. It will be appreciated that the slider engagement member 454 is similar in design and function to the slider engagement members 54 and 354 of the flexures 10 and 310, respectively, described above.

The flexure 410 is similar in design and operation to the flexure 310 described above, the exception being that the mounting arms 450, 451 of the flexure 410 support the slider receiving member 436 from points near its proximal end 447. It has been found that supporting the slider receiving member 436 near its proximal end 447 further enhances the flexibility of the slider receiving member 436 in supporting the slider (not shown) when under load and provides positive electrical contact and stability between the lead contact pads 446 and the slider terminal pads (not shown in FIG. 6).

Figure 7:
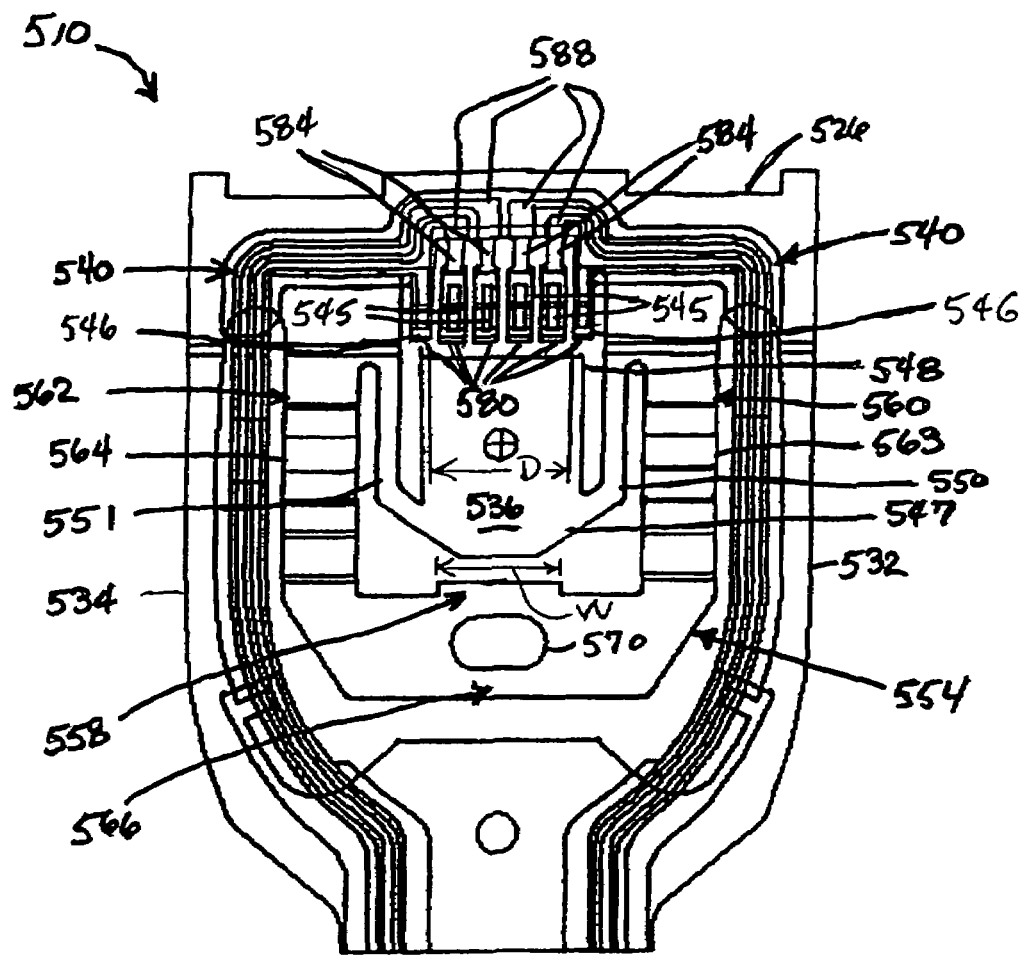
FIG. 7 is a plan view of a portion of a wireless flexure including lead contact pads having reduced-width necks according to another embodiment of the present invention.

FIG. 7 is a plan view of a distal portion of a flexure 510 according to another embodiment of the present invention. As shown in FIG. 7, the flexure 510 includes a cross member 526 extending between a pair of laterally spaced flexure arms 532 and 534, a slider receiving member 536 between the flexure arms 532, 534, and a plurality of integrated leads 540. As illustrated, the leads 540 terminate in lead contact pads 545, 546 adjacent to the slider receiving member 536. The slider receiving member 536 has a proximal end 547 and a distal end 548, and is supported from the cross member 526 by a pair of mounting arms 550, 551 attached to the slider mounting member 536 near its proximal end 547.

As further illustrated, the flexure 510 also includes a deflectable slider engagement member 554 for releasably mounting a slider (not shown) to the slider receiving member 536. The slider engagement member 554 includes a slider engagement portion 558, a pair of laterally spaced spring arms 560, 562, and a tooling engagement portion 566 including, in the illustrated embodiment, an aperture 570. The spring arms 560, 562 extend from the cross member 526 to the slider engagement portion 558. In the illustrated embodiment, the spring arm 560 is positioned between the flexure arm 532 and the slider receiving member 536, and the spring arm 562 is positioned between the flexure arm 534 and the slider receiving member 536. As shown, the spring arms 560, 562 include, respectively, elastically extendable portions 563, 564. It will be appreciated that the slider engagement member 554 is similar in design and function to the slider engagement members 54, 354, and 454 of the flexures 10, 310, and 410, respectively, described above.

In the embodiment illustrated in FIG. 7, the lead contact pads 545, 546 each include an end portion 580 for mechanically and electrically contacting a slider terminal pad (not shown). As further shown, the lead contact pads 545 include a reduced-width neck portion 584 and a base portion 588. As shown, both the end portions 580 and the base portions 588 of the lead contact pads 545 have larger widths than the neck portions 584. The reduced-width neck portions 584 facilitate forming of the lead contact pads 545 and allow the lead contact pads 545 to have a lower spring rate than the lead contact pads 546. This difference in spring rates between the respective lead contact pads 545 and 546 enhances positive electrical contact between the lead contact pads and the slider terminal pads (not shown in FIG. 7).

As further shown, in the illustrated embodiment, the slider engagement portion 558 has a width W that is smaller than the distance D between the lead contact pads 546 to permit torsional motion of the slider and ensure positive electrical contact between the lead contact pads 545, 546 and the slider terminal pads (not shown). It will be appreciated that this torsional motion is also facilitated by the bump 72 illustrated in FIG. 2A.

Figure 8:
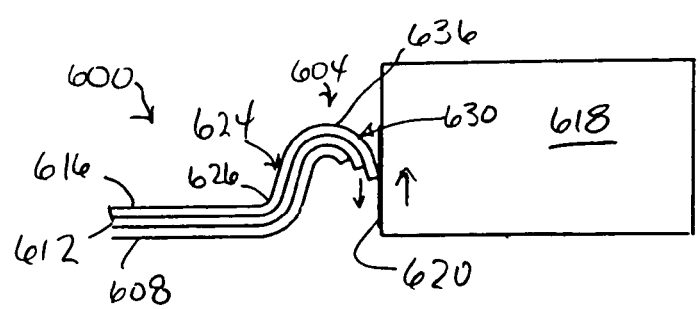
FIGS. 8 and 9 illustrate schematic side views of lead contact pads according to exemplary embodiments of the present invention.

FIG. 8 is a schematic side view of a portion of a lead 600 including a non-linear (i.e., bent) lead contact pad 604 according to one embodiment of the present invention. As shown in FIG. 8, the lead 600 includes a base layer 608, an intermediate layer 612, and an upper layer 616 for electrically contacting and frictionally engaging a slider 618, and in particular, a slider terminal pad 620. The lead contact pad 604 further includes a proximal portion 624 bent away from the major plane of the lead 600 at a curve 626, and a distal portion 630 extending toward the major plane of the lead 600 from a second curve 636. The bent lead contact pad 604 is deflectable, and forms a spring-like structure for positively engaging the terminal pad 620. Additionally, the illustrated orientation of the distal portion 630 provides a structure for resisting and minimizing lifting of the slider 618 (indicated by the opposing arrows in FIG. 8) when under load.

The layers 608, 612, and 616 can be made from any materials conventionally used for integrated leads in a flexure. In one embodiment, the base layer 608 is made from a relatively rigid material such as stainless steel to provide the primary spring force. In one embodiment, the intermediate layer 612 is made from a dielectric material such as polyimide, and the upper layer 616 is made from an electrically conductive material such as copper or a copper alloy. It will be appreciated, however, that the foregoing materials are exemplary only, and other materials can be used. Additionally, any portions of the layers 608, 612 and/or 616 may be selectively removed to reduce the spring rate of the lead 600.

Figure 9:
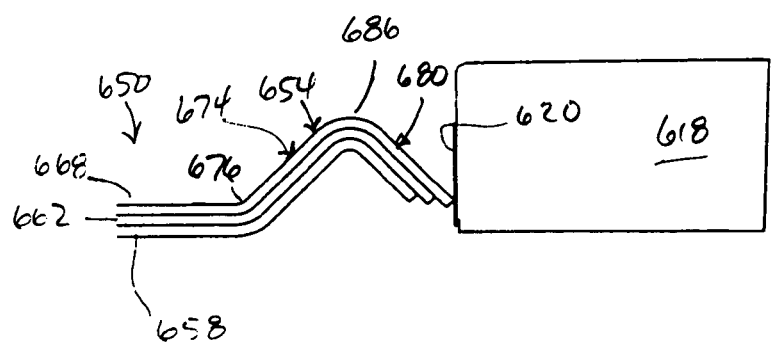

FIG. 9 illustrates an alternative lead 650 including a lead contact pad 654 which are also of a three-layer design and are otherwise similar in design and function to the lead 600 and lead contact pad 604 described above. Thus, as shown in FIG. 9, the lead 650 includes a base layer 658, an intermediate layer 662, and an upper layer 668 for electrically contacting and frictionally engaging the slider terminal pad 620. The lead contact pad 654 further includes a proximal portion 674 bent away from the major plane of the lead 650 at a curve 676, and a distal portion 680 extending toward the major plane of the lead from a second curve 686. As shown, the proximal and distal portions 674 and 680 extend generally linearly distal of the curves 676 and 686, respectively. Additionally, the proximal and distal portions 674, 680 of the lead contact pad 654 are longer than the proximal and distal portions, 624 and 630 of the lead contact pad 604.

It will be appreciated that the lead contact pads 604, 654 can be used in and incorporated into any of the various flexure embodiments described herein.

Figure 10A:
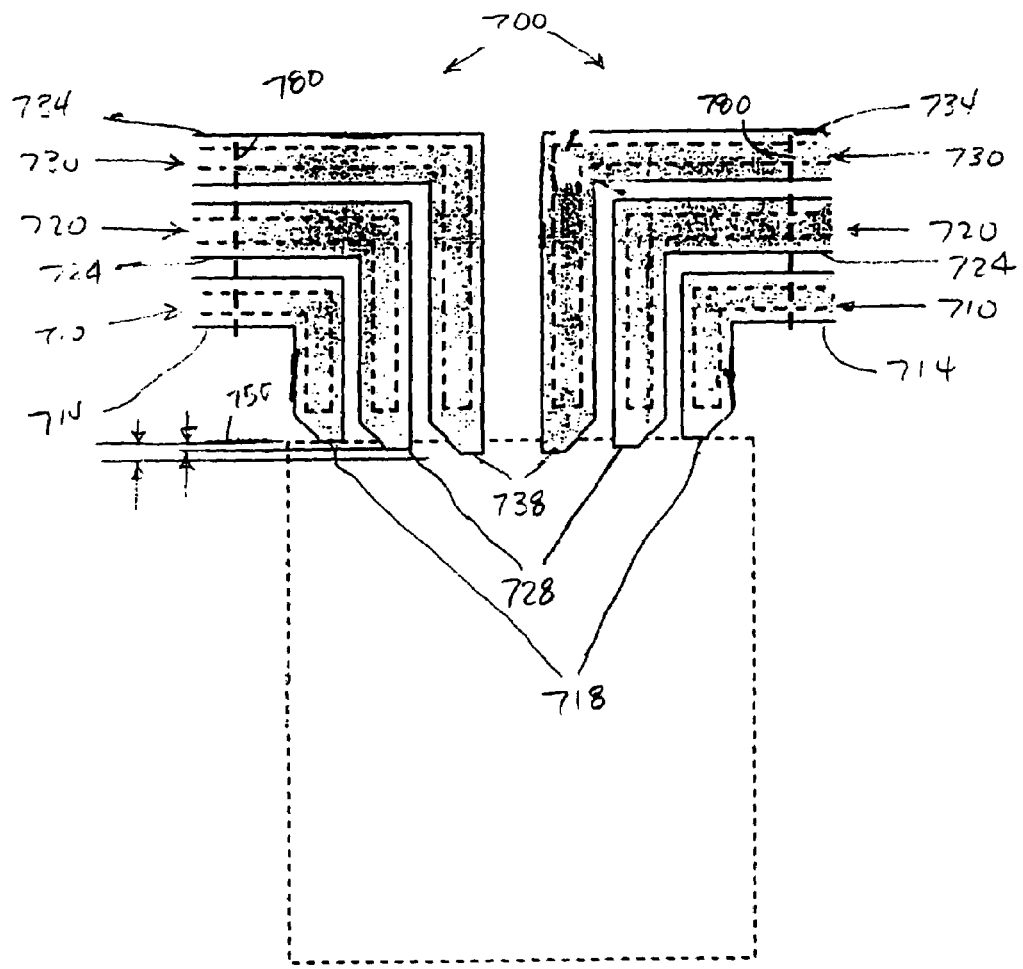
FIGS. 10A and 10B are schematic top and end views, respectively, of a plurality of integrated leads of a flexure according to another embodiment of the present invention.
Figure 10B:
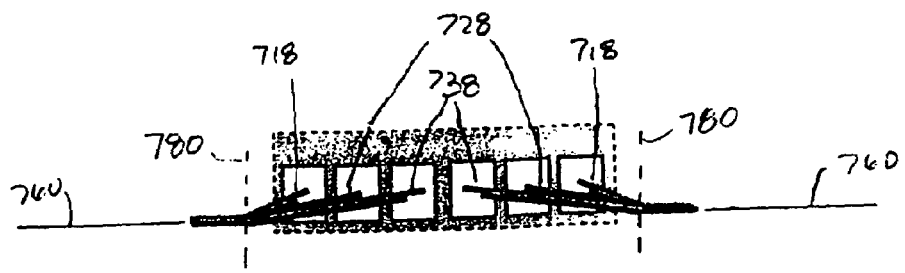

FIGS. 10A and 10B are schematic plan and end views, respectively, of plurality of integrated leads 700 according to another embodiment of the present invention. As shown in FIG. 10A, the plurality of integrated leads 700 includes a pair of outermost leads 710 including respective base portions 714 and terminating at respective outermost lead contact pads 718, a pair of intermediate leads 720 including respective base portions 724 and terminating at respective intermediate lead contact pads 728, and a pair of innermost leads 730 including respective base portions 734 and terminating at respective innermost lead contact pads 738.

As illustrated, for each of the pairs of leads 710, 720, and 730, the base portions 714, 724, and 734 are orientated at approximately right angles to the respective lead contact pads 718, 728, and 738. As further shown, the innermost lead contact pads 738 extend farther with respect to a location 750 of a row of terminal pads of a slider (shown for reference in phantom lines in FIGS. 10A and 10B) than do the intermediate lead contact pads 728. Additionally, the intermediate lead contact pads 728 extend farther than do the outermost lead contact pads 718, which in the illustrated embodiment extend approximately to the terminal pad locations 750. Because of their differing lengths, the respective pairs of lead contact pads have different spring rates. That is, the outermost lead contact pads 718 can have a spring rate that is equal to or greater than that of the intermediate lead contact pads 728, which in turn have a spring rate that is equal to or greater than that of the innermost lead contact pads 738. The relatively high spring rate outermost lead contact pads 718 can thus constrain the slider in position by providing a relatively high spring force to resist longitudinal and rotational movement of the slider. Additionally, the longer, lower spring rate intermediate and innermost lead contact pads 728, 738 promote positive electrical contact between the slider terminal pads and the lead contact pads.

As shown in the end view of FIG. 10B, the base portions 714, 724, and 734 generally lie in a plane 760, and the respective lead contact pads are bent at form lines 780 such that the lead contact pads lie out of the plane 760 of the base portions. Extending the lead contact pads 718, 728, and 738 out of the general plane 760 of the base portions as shown in FIG. 10B contributes to the spring rate differentiation among the respective lead contact pads, and advantageously provides structures for resisting lifting of the slider under load.

It will be appreciated that the plurality of leads 700 can be used in and incorporated into any of the various flexure embodiments described herein.

The flexures of the various embodiments of the present invention have numerous advantages over conventional flexure designs in which the head slider is permanently mechanically mounted to the flexure. For example, any of the flexures described above can be used as a tool or fixture to facilitate testing (e.g., dynamic electrical testing as is known in the art) of the slider without fixedly attaching the slider to the flexure. The slider can be releasably mounted to the flexure/testing tool and a series of tests can be performed on the slider and/or the flexure/slider assembly. If the slider fails one or more of these tests, it can be removed and a new slider can be releasably mounted and tested. Thus, the flexure/testing tool can be reused, and need not be discarded if a slider fails the testing as is required when using conventional flexures to which the sliders are fixedly mounted prior to testing.

Additionally, if the slider passes the appropriate testing, and if desired, the slider can be permanently mounted to the flexure to provide a production flexure assembly. For example, the slider terminal pads and lead contact pads can be soldered together to both mechanically and electrically couple the slider to the flexure. Additionally or alternatively, the slider can be mechanically coupled to the flexure (e.g., to the tongue) using, for example, adhesives as are known in the art.

It will be appreciated that the deflectable members (e.g., the deflectable slider engagement member 54) described above for releasably mounting a slider to a flexure can also be adapted to releasably mount other electrical components (e.g., an integrated circuit chip) to the flexure and/or other disk drive suspension component (e.g., the load beam).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for mounting a head slider of the type having terminal pads to a wireless disk drive head suspension flexure, comprising:
   providing a wireless flexure having a slider mounting region, lead contact pads and a deflectable and resilient slider engagement member spaced from the lead contact pads, wherein the slider engagement member includes a tooling engagement member and is relatively rigid with respect to the lead contact pads, and wherein the lead contact pads are deflectable with respect to the slider engagement member;
   engaging and deflecting the slider engagement member and positioning the head slider onto the slider mounting region and between the lead contact pads and the slider engagement member while the slider engagement member is deflected including:
      engaging tooling with the tooling engagement member and actuating the tooling to deflect the slider engagement member; and
      positioning the head slider onto the slider mounting region while the slider engagement member is deflected; and disengaging the slider engagement member and causing the slider engagement member to force the head slider into frictional engagement with the lead contact pads and the slider engagement member with the lead contact pads in mechanical and electrical contact with the head slider terminal pads, wherein disengaging the slider engagement member includes releasing the tooling from the tooling engagement member, and wherein forcing the head slider into frictional engagement with the lead contact pads includes deflecting the lead contact pads.

2. The method of claim 1 and further comprising:
engaging tooling with the tooling engagement member and actuating the tooling to deflect the slider engagement member from engagement with the head slider;
removing the head slider from the slider mounting region; and
releasing the tooling from the tooling engagement member.

3. The method of claim 1 and further comprising forcing the head slider out of frictional engagement between the lead contact pads and the slider engagement member.

4. The method of claim 1 wherein at least some of the lead contact pads have a reduced-width neck.

5. The method of claim 1 and further comprising applying an electrically conductive substance to a lead contact pad and terminal pad interface to electrically and mechanically couple the lead contact pads to the slider terminal pads.

6. The method of claim 1 and further comprising applying adhesive or other substances for mechanically attaching the head slider to the slider mounting region.

7. The method of claim 1 wherein the wireless flexure further includes:
a base portion for mounting the flexure to a load beam;
a pair of laterally-spaced flexure arms extending from the base portion;
a cross member extending between the flexure arms;
a slider mounting region having a proximal end and a distal end;
mounting arms extending from the cross member for supporting the slider mounting region between the flexure arms; and
a plurality of integrated leads terminating at lead contact pads.

8. The method of claim 7 wherein the mounting arms extend from the cross member and engage the slider mounting region generally midway between the proximal end and the distal end.

9. The method of claim 7 wherein mounting arms extend from the cross member and engage the slider mounting region adjacent the proximal end.

10. The method of claim 7 wherein the deflectable slider engagement member includes:
a pair of spring arms extending proximally from the cross member between the flexure arms and mounting arms; and
a slider engaging portion extending between the spring arms.

11. The method of claim 10 wherein each of the spring arms includes an elastically extendable portion formed out of a general plane of the flexure arms.

12. The method of claim 1 further comprising performing one or more tests on the slider.

13. A method for mounting a head slider of the type having terminal pads to a wireless disk drive head suspension flexure, comprising:
providing a wireless flexure having a slider mounting region, a plurality of integrated leads terminating at spaced-apart, deflectable, lead contact pads, and a deflectable and resilient slider engagement member spaced from the lead contact pads, the plurality of lead contact pads including outermost lead contact pads having a first spring rate and one or more innermost lead contact pads having a second spring rate, wherein the first spring rate is equal to or greater than the second spring rate;
engaging and deflecting the slider engagement member and positioning the head slider onto the slider mounting region and between the lead contact pads and the slider engagement member while the slider engagement member is deflected; and
disengaging the slider engagement member and causing the slider engagement member to force the head slider into frictional engagement with the lead contact pads and the slider engagement member with the lead contact pads in mechanical and electrical contact with the head slider terminal pads such that the outermost lead contact pads exert a first spring force on the head slider and the one or more innermost lead contact pads exert a second spring force on the head slider, the first spring force being equal to or greater than the second spring force.

14. The method of claim 13 wherein each of the integrated leads has a base portion extending at an angle from the respective lead contact pad and defining a plane, wherein at least some of the leads are formed at the respective base portions to locate the lead contact pads out of the plane of the base portions.

15. The method of claim 14 wherein each of the integrated leads has a base portion extending at a generally right angle from the respective lead contact pad, wherein the base portions of the leads are formed about a line generally parallel to the lead contact pads.

16. The method of claim 13 wherein the plurality of integrated leads includes at least six integrated leads including at least the outermost lead contact pads, a pair of innermost lead contact pads and a pair of intermediate lead contact pads between the outermost and innermost contact lead pads and having a third spring rate, wherein the first spring rate is greater than the third spring rate, and the third spring rate is greater than the second spring rate.

17. A method for mounting a head slider of the type having a row of slider terminal pads at terminal pad locations to a wireless disk drive head suspension flexure, comprising:
providing a wireless flexure having:
a slider mounting region for receiving the slider;
a plurality of integrated leads terminating at spaced-apart, elastic, deflectable, lead contact pads including outermost lead contact pads and one or more innermost lead contact pads, wherein in a free state the one or more innermost lead contact pads extend farther than the outermost lead contact pads with respect to the terminal pad locations; and
a deflectable and resilient slider engagement member spaced from the lead contact pads;
engaging and deflecting the slider engagement member and positioning the head slider onto the slider mounting region and between the lead contact pads and the slider engagement member while the slider engagement member is deflected; and
disengaging the slider engagement member and causing the slider engagement member to force the head slider into frictional engagement with the lead contact pads and the slider engagement member with the lead contact pads in mechanical and electrical contact with the head slider terminal pads, such that the outermost lead contact pads exert a first force on the head slider and the one or more innermost lead contact pads exert a second force on the head slider, the first force being equal to or greater than the second force.

18. The method of claim 17 wherein the plurality of integrated leads includes at least six integrated leads including at least the outermost lead contact pads, a pair of innermost lead contact pads and a pair of intermediate lead contact pads between the outermost and innermost lead contact pads, wherein the innermost lead contact pads extend farther than the intermediate lead contact pads with respect to the terminal pad locations, and the intermediate lead contact pads extend farther than the outermost lead contact pads with respect to the terminal pad locations.

* * * * *